United States Patent
Song et al.

(10) Patent No.: US 9,656,342 B2
(45) Date of Patent: May 23, 2017

(54) APPARATUS FOR REPLACING WELDING TIP FOR SPOT WELDING

(71) Applicant: SUNGWOO HITECH CO., LTD., Busan (KR)

(72) Inventors: Byungsun Song, Busan (KR); Mun Yong Lee, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 246 days.

(21) Appl. No.: 14/525,295

(22) Filed: Oct. 28, 2014

(65) Prior Publication Data
US 2015/0298239 A1    Oct. 22, 2015

(30) Foreign Application Priority Data
Apr. 22, 2014    (KR) .................. 10-2014-0048241

(51) Int. Cl.
*B23K 11/30* (2006.01)
(52) U.S. Cl.
CPC ................ *B23K 11/3072* (2013.01)
(58) Field of Classification Search
CPC ............................... B23K 11/3072
See application file for complete search history.

(56) References Cited

U.S. PATENT DOCUMENTS

| | | | | |
|---|---|---|---|---|
| 4,649,613 A * | 3/1987 | Bednarik | ........... | B23K 11/3072 29/253 |
| 4,794,221 A * | 12/1988 | Takabe | ............... | B23K 11/3072 219/86.1 |
| 4,904,838 A * | 2/1990 | Szantho | ............. | B23K 11/3063 219/86.33 |
| 5,073,692 A * | 12/1991 | Jackson | ............. | B23K 11/3072 219/86.7 |
| 5,495,663 A * | 3/1996 | Saito | .................. | B23K 11/3072 29/253 |
| 2015/0298239 A1* | 10/2015 | Song | .................. | B23K 11/3072 29/762 |

FOREIGN PATENT DOCUMENTS

JP    05-245653    9/1993
KR    10-1381159    3/2014

* cited by examiner

*Primary Examiner* — Minh Trinh
(74) *Attorney, Agent, or Firm* — Lex IP Meister, PLLC

(57) ABSTRACT

Disclosed is an apparatus for replacing a welding tip for spot welding. In an exemplary embodiment of the present invention, the apparatus for replacing a welding tip for spot welding includes a post installed in a workplace having a spot welding machine with upper, and lower welding guns provided thereto, a base plate mounted on a top of the post, a welding tip removing unit mounted on one side of an upper side of the base plate for clamping and removing a spent welding tip mounted to the upper welding gun or the lower welding gun by operation of a cylinder, a holder unit mounted on the upper side of the base plate spaced from the welding tip removing unit, and a welding tip cassette mounted to the holder unit in a state new welding tips to be mounted to the upper, and lower welding guns are set in an upper side and a lower side thereof.

16 Claims, 9 Drawing Sheets

APPARATUS FOR REPLACING WELDING TIP FOR SPOT WELDING

CROSS-REFERENCE TO RELATED APPLICATION

This application claims priority to and the benefit of Korean Patent Application No. 10-2014-0048241 filed in the Korean Intellectual Property Office on Apr. 22, 2014, the entire contents of which are incorporated herein by reference.

BACKGROUND OF THE INVENTION (a) Field of the Invention

The present invention relates to an apparatus for replacing a welding tip for spot welding. More particularly, the present invention relates to an apparatus for replacing a welding tip for spot welding, which can replace a worn down welding tip with a new welding tip automatically, if the welding tips respectively mounted to upper and lower welding guns of a welding machine are worn down.

(b) Description of the Related Art

In general, in a vehicle body assembly process, spot resistance welding is used widely as a method for welding two sheets of panels. The spot resistance welding is electrical resistance welding in which the welding is carried out by applying a current to surfaces of the panels to generate welding heat while applying a pressure to the surfaces of the panels.

In general, the spot resistance welding is carried out by a welding robot with a spot welding gun provided to a fore end thereof.

Referring to FIG. 9, the spot welding gun is provided with a fixed electrode rod 1 (I.e., a holder) and a movable electrode rod 3 (I.e., shank), welding tips 5 mounted inserted in the fixed electrode rod 1 and the movable electrode rod 3 respectively, and a welding gun driving unit for generating a pressure to drive the movable electrode rod 3.

The welding tips 5 are mounted inserted in the fore end of each of the fixed electrode rod 1 and the movable electrode rod 3, and the fore ends have a diameter of, for an example, 6 mm, and the other portion has a diameter of about 16 mm.

The spot welding gun carries out welding of the two sheets of panels 10, placing the two sheets of the panels 10 to be welded between the fixed electrode rod 1 and the movable electrode rod 3.

If the welding is carried out placing the panels 10 between the fixed electrode rod 1 and the movable electrode rod 3 repeatedly, the fore end of the welding tip 5 is worn down by the pressure and the heat, and, since defective welding takes place if wearing down is progressed more than a threshold limit value, it is required to replace the welding tip 5, periodically.

However, in the related art, when the welding tip 5 is intended to be replaced, since the worker replaces the welding tip with a pipe wrench and hammer manually, taking an extensive time period, the related art welding tip replacement has problems in that productivity is poor and replacement defects take places.

Moreover, the worker's personal entering to the process line and replacing the welding tip 5 at the spot welding gun mounted to the robot exposes the worker to many risk elements, and, if the welding tip 5 is replaced by using the hammer, problems may be caused, in which partial damage takes place to the welding tip, or positions of the upper and lower welding guns are misaligned.

Matters described in this background section are for enhancement of understanding of the background of the invention and, therefore, they may contain matters which are not related arts known to persons skilled in this field of art.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus for replacing a welding tip for spot welding having advantages of enabling to replace a worn down welding tip with a new welding tip, automatically.

Accordingly, an object of the present invention, for solving above problems, is to provide an apparatus for replacing a welding tip for spot welding, which can replace a worn down welding tip automatically, if welding tips respectively mounted to upper and lower welding guns of a spot welding machine are worn down for reducing a time period required for replacement and alignment of the welding tip as well as devising a replacement process automation.

To achieve the objects of the present invention, an apparatus for replacing a welding tip for spot welding includes a post installed in a workplace having a spot welding machine with upper, and lower welding guns provided thereto, a base plate mounted on a top of the post, a welding tip removing unit mounted on one side of an upper side of the base plate for clamping and removing a spent welding tip mounted to the upper welding gun or the lower welding gun by operation of a cylinder, a holder unit mounted on the upper side of the base plate spaced from the welding tip removing unit, and a welding tip cassette mounted to the holder unit in a state new welding tips to be mounted to the upper, and lower welding guns are set in an upper side and a lower side thereof.

The welding tip removing unit may include a mounting plate mounted to the upper side of the base plate having an inserting hole formed in one side thereof for inserting the worn down welding tips mounted to the upper, and lower welding guns therein from an upper side and a lower side thereof, supporting blocks mounted on the mounting plate spaced a predetermined distance from each other on both sides of the inserting hole with the inserting hole disposed therebetween for holding one side of the welding tip at the upper, and lower welding guns inserted into the inserting hole, a clamper rotatably mounted to the mounting plate opposite to the supporting blocks in a state a rotation center of the clamper is positioned eccentric from a center of the clamper, a connecting bar having one end connected to the clamper, and a clamping cylinder mounted on the mounting plate to have a fore end of a operating rod thereof connected to the other end of the connecting bar.

Each of the supporting blocks has a corner portion positioned at a center of the inserting hole sloped to an outside from a center of the inserting hole to form a sloped side.

The clamper may be formed to have a circular block shape for making rotary translation toward the inserting hole when the clamping cylinder moves forward or backward.

The clamper may be rotatably mounted at a position spaced a predetermined distance upward from the mounting plate with a fixing rod mounted to the mounting plate.

The clamping cylinder may be a pneumatic cylinder operated by a pneumatic operating pressure.

The clamping cylinder may be a hydraulic cylinder operated by a hydraulic operating pressure.

The welding tip mounted to a fore end of the upper welding gun may be inserted in the inserting hole from an upper side of the inserting hole toward the lower side of the inserting hole, and the welding tip mounted to a fore end of the lower welding gun may be inserted in the inserting hole from the lower side of the inserting hole toward the upper side of the inserting hole.

The fore end of the operating rod of the clamping cylinder may be connected to the connecting bar with a clevis.

The holder unit may include a holding block mounted to the other side of the upper side of the base plate adjacent to the welding tip removing unit to have at least one mounting recess formed therein, and an attaching member mounted to the mounting recess for securing the welding tip cassette mounted to the holding block in a state the welding tip cassette is attached to the holding block.

The mounting recess may be formed in one side facing an outside of the holding block spaced a preset distance from, and opposite to, each other.

The attaching member may include a magnetic block having an operation switch provided to an upper side thereof for generating electromagnetic force selectively when the operation switch is operated.

The attaching member may have a square hexahedron cross section.

The holding block may have inserting rods mounted on opposite ends with the mounting recess arranged therebetween, respectively.

The welding tip cassette may have a plurality of holding holes formed in an upper side and a lower side in a length direction thereof for inserting and setting the welding tips and pass through holes formed in a width direction thereof on opposite ends thereof.

The holding holes may be formed at fixed intervals in the length direction of the welding tip cassette.

The welding tip cassette may be formed of a steel material.

The apparatus for replacing a welding tip for spot welding in accordance with an exemplary embodiment of the present invention permits automatic replacement of the worn down welding tips when the welding tips mounted to the upper, and lower welding guns of the spot welding machine are worn down for enabling to shorten a time period required for replacement and alignment of the welding tips, and to devise automation of the replacement process, thereby improving productivity and allowing to prevent defective welding tip replacement from taking place.

And, the automation of the welding tip replacement which has been done manually in the related art prevents the worker from being exposed to risky elements, to prevent accidents caused by negligence of safety from taking place, thereby safety of the worker can be secured.

Along with this, since partial damage of the welding tip or misalignment of the upper, and lower welding guns of the spot welding machine at the time of the replacement work can be prevented, durability of the spot welding machine can be improved, thereby permitting to save a maintenance cost.

Moreover, the possibility of replacement of the welding tips mounted to the upper, and lower welding guns with one apparatus for replacing a welding tip for spot welding in accordance with an exemplary embodiment of the present invention permits to save production cost, such as a labor cost come from worker's manual work.

DETAILED DESCRIPTION OF THE EMBODIMENT

Figure 1:
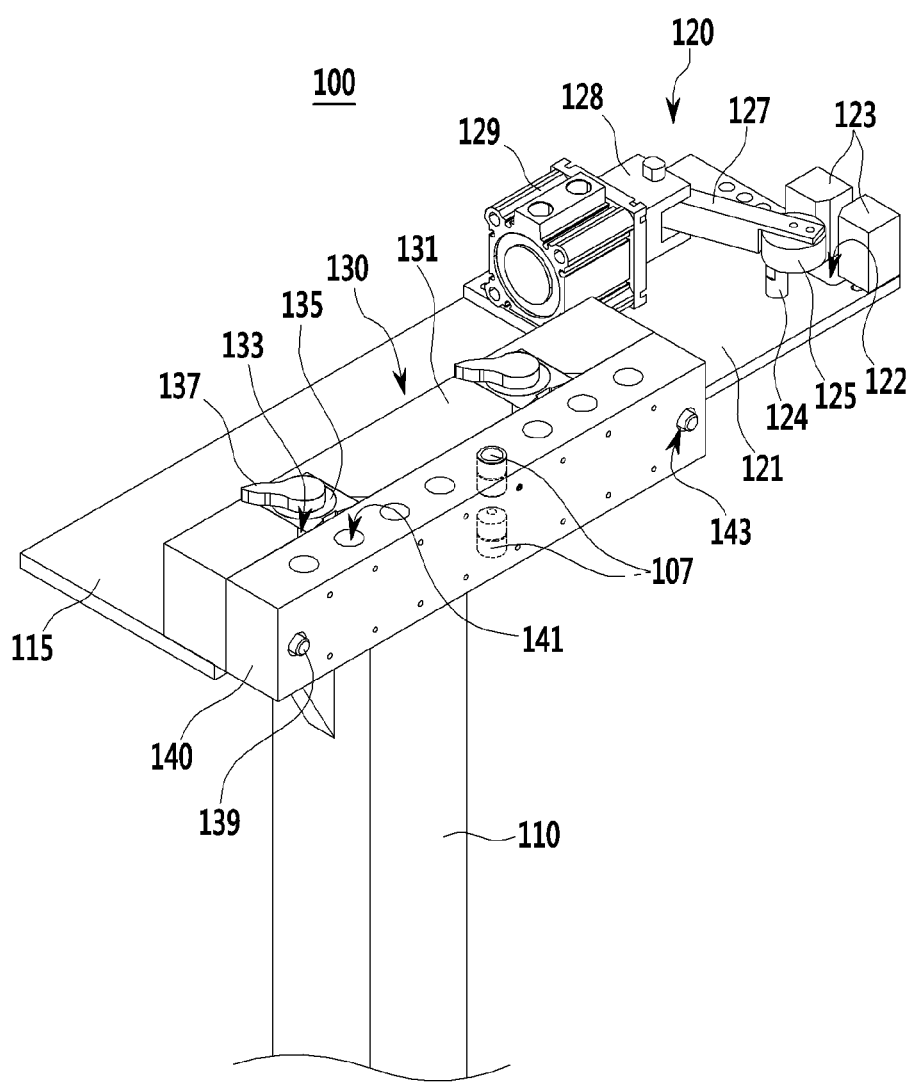
FIG. 1 illustrates a perspective view of an apparatus for replacing a welding tip for spot welding in accordance with an exemplary embodiment of the present invention.

An exemplary embodiment of the present invention will hereinafter be described in detail with reference to the accompanying drawings.

Before starting description of the embodiment, since elements described in the specification and shown in the drawings are no more than preferred embodiment of the present invention, and do not represent entire technical aspects of the present invention, it is required to understand that there may be different equivalents and variations which can substitute the embodiments at this time of filing of the present invention.

Parts not relevant to the present invention will be omitted for describing the present invention clearly, and throughout the specification, identical or similar parts will be given the same reference numbers.

And, since sizes and thicknesses of elements are shown at will for convenience of description, the present invention is not limited to the drawings without fail, but the thicknesses are exaggerated for expressing different parts and regions, clearly.

Throughout the specification, unless explicitly described to the contrary, the word "comprise" and variations such as "comprises" or "comprising", will be understood to imply the inclusion of stated elements but not the exclusion of any other elements.

And, terms, such as " . . . . Unit", " . . . . Means", mean a unit of an element having at least one function or operation.

Figure 2:
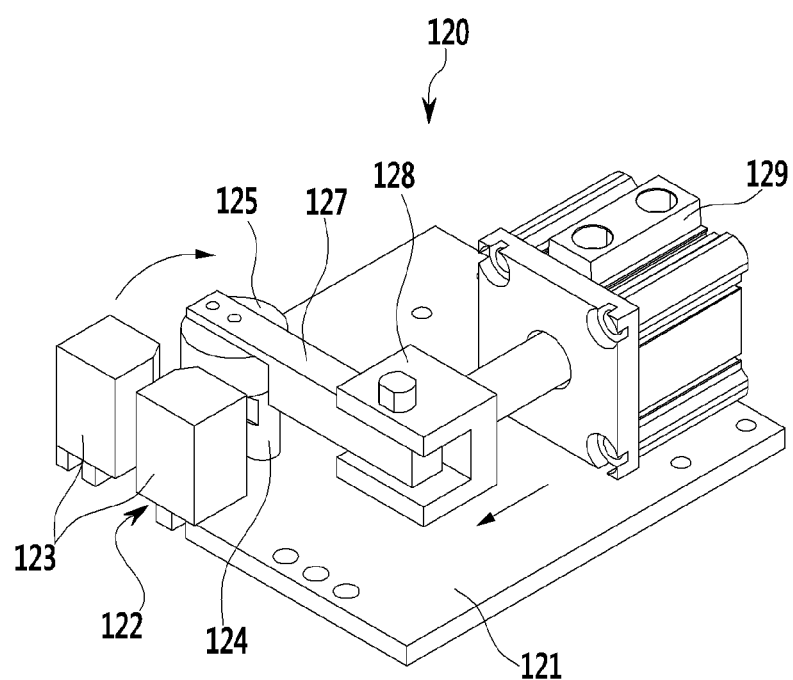
FIG. 2 illustrates a perspective view of a welding tip removing unit applicable to an apparatus for replacing a welding tip for spot welding in accordance with an exemplary embodiment of the present invention.

FIG. 1 illustrates a perspective view of an apparatus for replacing a welding tip for spot welding in accordance with an exemplary embodiment of the present invention, and FIG. 2 illustrates a perspective view of a welding tip removing unit applicable to an apparatus for replacing a welding tip for spot welding in accordance with an exemplary embodiment of the present invention.

Referring to FIGS. 1 and 2, the apparatus for replacing a welding tip for spot welding 100 replaces worn down welding tips 107 automatically, if the welding tips 107 respectively mounted to fore ends of upper and lower welding guns 103, and 105 of a spot welding machine 101 are worn down, for reducing a time period required for replacement and alignment of the welding tips 107 as well as devising a replacement process automation.

For this, referring to FIG. 1, the apparatus 100 for replacing a welding tip for spot welding in accordance with an exemplary embodiment of the present invention includes a post 110, a base plate 115, a welding tip removing unit 120, a holder unit 130 and a welding tip cassette 140.

The post 110 is installed at a workplace having the spot welding machine 101 with the upper and lower welding guns 101 and 105 provided thereto.

The base plate 115 is constructed of a rectangular steel plate mounted on a top of the post 110.

In the present exemplary embodiment, the welding tip removing unit 120 is mounted to one side of an upper side of the base plate 115, for clamping the spent welding tip 107 mounted to the upper welding gun 103 or the welding gun 105 and separating and removing the welding tip 107 from the welding gun 103 or 105 by operating a cylinder.

Referring to FIGS. 1 and 2, the welding tip removing unit 120 includes a mounting plate 121, supporting blocks 123, a clamper 125, a connecting bar 127 and a clamping cylinder 129.

The mounting plate 121 is mounted to the top of the base plate 115 and has an inserting hole 122 formed in one side thereof for inserting the worn down welding tip 107 mounted to the upper, or lower welding gun 103 or 105 from an upper side or a lower side thereof.

The supporting blocks 123 are mounted on the upper side of the mounting plate 121 spaced predetermined distances from opposite sides of one end of the inserting hole 122 to dispose the inserting hole 122 between the supporting blocks 123, respectively.

The supporting blocks 123 support sides of the welding tip 107 at the upper, or lower welding guns 103 or 105 being inserted into the inserting hole 122, respectively.

In this case, each of the supporting blocks 123 may have a vertical corner portion positioned at a center of the inserting hole 122 sloped to face an outside from the center of the inserting hole 122 to form a sloped side.

According to this, the welding tip 107 is supported by the sloped sides between the supporting blocks 123.

In the meantime, the welding tip 107 mounted to the fore end of the upper welding gun 103 may be inserted in the inserting hole 122 from an upper side toward a lower side thereof, and the welding tip 107 mounted to the fore end of the lower welding gun 105 may be inserted in the inserting hole 122 from a lower side toward an upper side thereof.

That is, if the upper, or lower welding gun 103 or 105 is inserted into the inserting hole 122 from the upper side or the lower side of the inserting hole 122, the supporting blocks 123 support opposite sides of one sides of the welding tip 107 with the sloped sides, securely.

In the present exemplary embodiment, the clamper 125 has a circular block shape mounted on the mounting plate 121 opposite to the supporting blocks 123 to be rotatable in a state a rotation center thereof is eccentric from a center of the circular block for clamping the welding tip 107 in the inserting hole 122 held by the sloped sides of the supporting blocks 123 when the clamper 125 rotates.

Therefore, while rotating round the eccentric rotation center, an outside circumferential surface of the clamper 125 may move over the mounting plate 121 toward the inserting hole 122.

The clamper 125 may be rotatably mounted at a position spaced a predetermined distance to an upper side from the mounting plate 121 with a fixing rod 124 mounted to the mounting plate 121.

The connecting bar 127 has one end connected to the clamper 125.

And, the clamping cylinder 129 is mounted to the mounting plate 121 and includes an operating rod having a fore end connected to the other end of the connecting bar 127.

The connecting bar 127 makes the clamper 125 connected to the connecting bar 127 to rotate toward the inserting hole 122 with reference to the eccentric rotation center C selectively as the connecting bar 127 reciprocates forward and backward.

And, the clamping cylinder 125 may have the fore end of the operating rod mounted to the connecting bar 127 with a clevis 128.

In this case, the connecting bar 127 may be, but not limited to, a pneumatic cylinder operated by a pneumatic pressure, and a hydraulic pressure may be used instead of the pneumatic pressure.

In the meantime, in the present exemplary embodiment, the clamper 125 may have a knurled predetermined outside circumferential surface section which is to make rotary translation toward the inserting hole 122 by the connecting bar 127 with reference to the rotation center C when the clamping cylinder 129 is operated.

In this case, the knurled predetermined outside circumferential surface section of the clamper 125 enables securer clamping of the welding tip 107 together with the supporting blocks 123.

Figure 3:
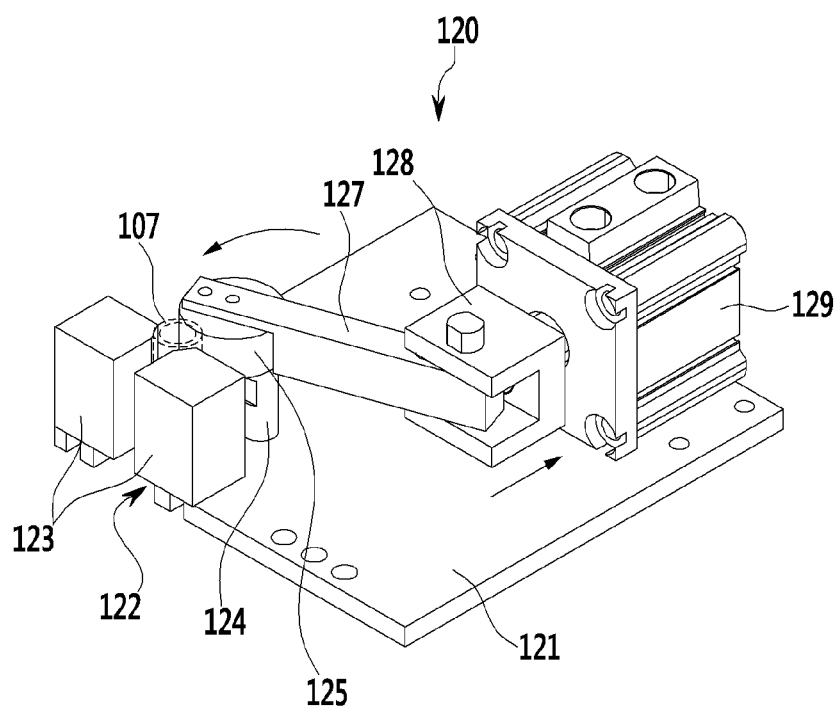
FIG. 3 illustrates a perspective view of an operation state of a welding tip removing unit applicable to an apparatus for replacing a welding tip for spot welding in accordance with an exemplary embodiment of the present invention.

Referring to FIG. 3, the welding tip removing unit 120 having above configuration will be described.

FIG. 3 illustrates a perspective view of an operation state of a welding tip removing unit applicable to an apparatus for replacing a welding tip for spot welding in accordance with an exemplary embodiment of the present invention.

In the present exemplary embodiment, in an initial state when the upper, and lower welding guns 103 and 105 are not inserted, as shown in FIG. 2, the welding tip removing unit 120 maintains a state in which the clamping cylinder 129 moves forward to rotate the clamper 125 toward an opposite side of the inserting hole 122 with reference to the eccentric rotation center.

In this state, referring to FIG. 3, if the upper, or lower welding gun 103 or 105 is inserted in the upper side or the lower side of the inserting hole 122, the welding tip removing unit 120 makes the clamping cylinder 129 to move the operating rod backward to transmit operation power to the connecting bar 127 connected thereto with the clevis 128.

Then, the connecting bar 127 rotates round the fixing rod 124 mounted to the eccentric rotation center of the clamper 125.

In this case, the outside circumferential surface of the clamper 125 makes rotary translation toward the inserting hole 122 with reference to the eccentric rotation center, such that a portion of the knurled outside circumferential surface of the clamper 125 is brought into contact with the welding tip 107, making the welding tip 107 to move between the sloped surfaces of the supporting blocks 123 until the welding tip 107 is clamped with the knurled outside circumferential surface in a state one side of the welding tip 107 is held between the supporting blocks 123.

According to this, with the operation described before, the welding tip removing unit 120 clamps the worn down welding tip 107 mounted to the welding gun 103 or 105, and removes the welding tip 107 from the welding gun 103 or 105 as the upper, or lower welding guns 103 or 105 move upward or downward in a state the clamping is finished.

In the present exemplary embodiment, the holder unit 130 is mounted on the base plate 115 at a position spaced from the welding tip removing unit 120 for mounting the welding tip cassette 140 thereto.

In this case, the holder unit 130 includes a holding block 131 and an attaching member 135.

The holding block 131 is mounted to the other side of the upper side of the base plate 115 adjacent to the welding tip removing unit 120 to have at least one mounting recess 133 formed therein.

The mounting recess 133 may be formed in both sides spaced a predetermined distance from each other in a side facing an outside of the holding block 131.

In this case, the holding block 131 may have inserting rods 139 mounted to opposite ends thereof with the mounting recesses 133 arranged therebetween.

And, the attaching member 135 is mounted to the mounting recess 133 for securing the welding tip cassette 140 mounted to the holding block 131 in a state the welding tip cassette 140 is attached to the holding block 131.

In this case, the attaching member 135 has one side provided with an operation switch 137, and may be constructed of a magnetic block which may generate electromagnetic force according to on/off of the operation switch 137, selectively.

That is, if the operation switch 137 is turned on, the attaching member 135 maintains the welding tip cassette 140 of steel material to be in a state in which the welding tip cassette 140 is secured to the holding block 131 by using the electromagnetic force generated thus.

Opposite to this, if the operation switch 137 is turned off, the attaching member 135 discontinues the generation of the electromagnetic force, to release the attachment of the welding tip cassette 140 in a state attached and secured to make the welding tip cassette 140 to fall off from the holding block 131.

The attaching member 135 may have a square hexahedron shape.

And, the welding tip cassette 140 is mounted to the holder unit 130 in a state new welding tips 107 to be mounted to the upper, and lower welding guns 103 and 105 are set to an upper side and a lower side thereof, respectively.

In this case, the welding tip cassette 140 is formed of the steel material for being attached and secured to the holding block 131 by the electromagnetic force of the attaching member 135, and has a plurality of holding holes 141 formed in a length direction thereof in an upper surface and a lower surface thereof for setting new welding tips 107 to replace.

The holding holes 141 are formed at fixed intervals in a length direction of the welding tip cassette 140 and the welding tip cassette 140 may have pass through holes 143 formed in opposite ends thereof in a width direction thereof matched to the inserting rods 139, respectively.

According to this, if new welding tips 107 are set in the holding holes 135 formed in the upper side and the lower side of the welding tip cassette 140, in a state the inserting rods 139 of the holding block 131 are inserted in, and passed through, the pass through holes 143 respectively, by turning on the operation switch 137 of the attaching member 135, the welding tip cassette 140 is attached, and secured to the holding unit 130.

Hereafter, operation and advantages of the apparatus for replacing a welding tip for spot welding 100 in accordance with an exemplary embodiment of the present invention will be described in detail.

FIGS. 4 to 8 illustrate perspective views of operation states of an apparatus for replacing a welding tip for spot welding in accordance with an exemplary embodiment of the present invention, respectively.

First, an worker places and sets new welding tips 107 to replace in the holding holes 141 formed in the upper side and the lower side of the welding tip cassette 140.

Figure 4:
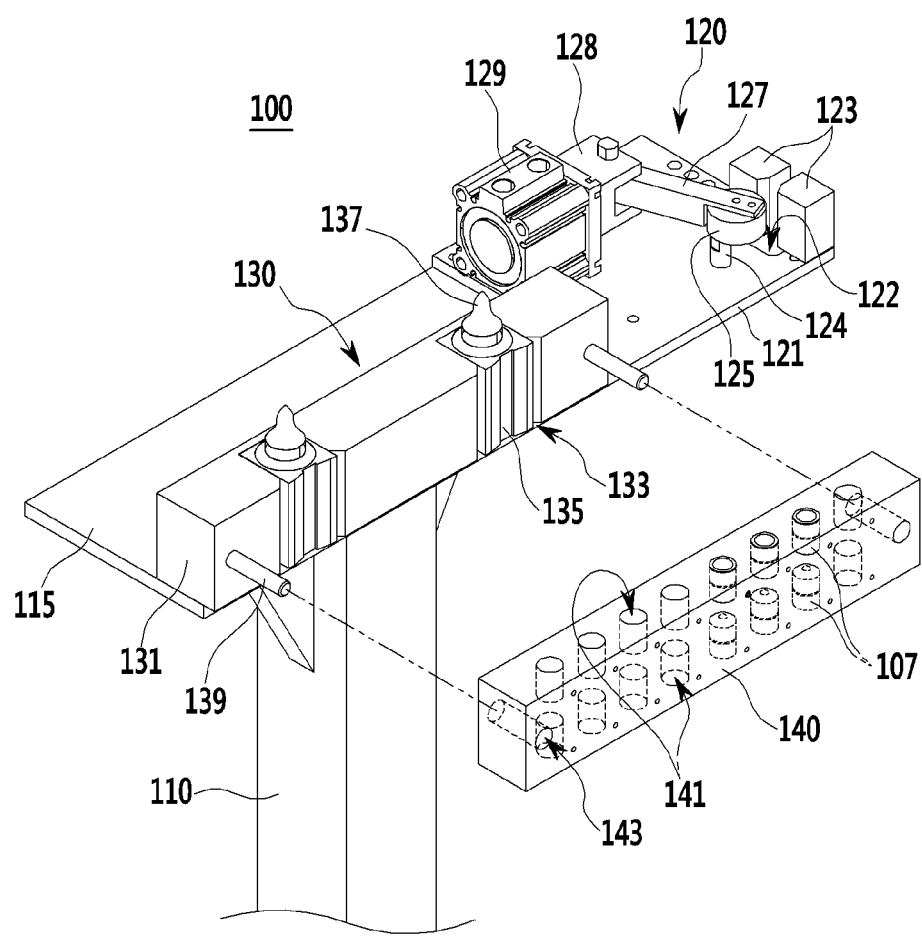
FIGS. 4 to 8 illustrate perspective views of operation states of an apparatus for replacing a welding tip for spot welding in accordance with an exemplary embodiment of the present invention, respectively.

Then, referring to FIG. 4, after inserting the inserting rods 139 of the holding block 131 through the pass through holes 143 in the welding tip cassette 140 respectively, the worker turns on the operation switches 137 of the attaching members 135 in a state the welding tip cassette 140 is in contact with the holding block 131, respectively.

Then, the welding tip cassette 140 maintains a state in which the welding tip cassette 140 is secured to the holding unit 130 by the electromagnetic force generated by the attaching members 135.

Figure 5:
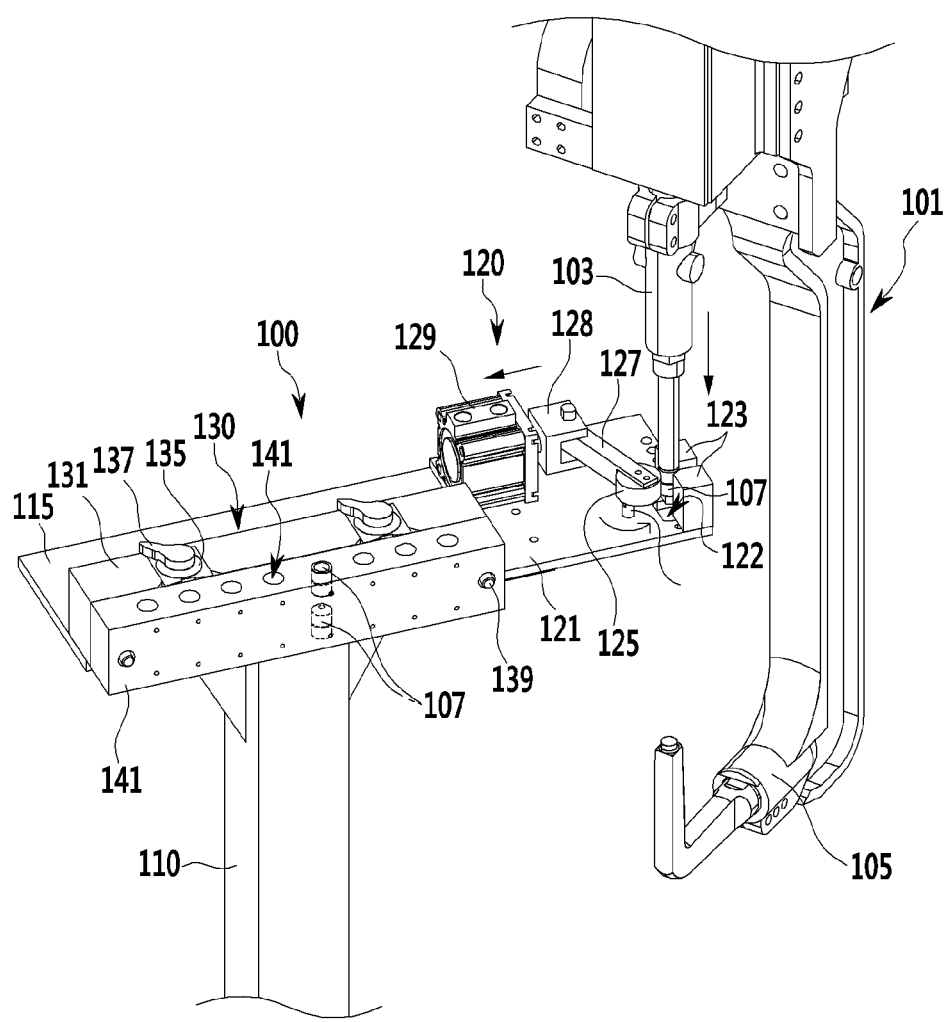

In this state, referring to FIG. 5, the upper welding gun 103 or the lower welding gun 105 having the welding tip 107 worn down to require replacement mounted thereto is made to insert the welding tip 10 required to be replaced into the inserting hole 122 formed in the mounting plate 121 of the welding tip removing unit 120 from the upper side or the lower side thereof by operation of the robot (Not shown) having the spot welding machine mounted thereto.

Then, upon finishing insertion of the welding tip 105, the clamping cylinder 129 makes the operation rod to move backward to transmit operation power to the connecting bar 127 connected with the clevis 128, for rotating the connecting bar 127.

Then, the clamper 125 rotates toward the inserting hole 122 with reference to the fixing rod 124 mounted to the eccentric rotation center according to the rotation of the connecting bar 127.

Accordingly, a portion of the knurled outside circumferential surface of the clamper 125 is brought into contact with the welding tip 107, making the welding tip 107 to move between the sloped sides of the supporting blocks 123 to clamp the welding tip 107 with the knurled outside circumferential surface in a state one side of the welding tip 107 is held by the sloped sides of the supporting blocks 123.

Thus, upon finishing clamping of the welding tip 107 with the clamper 125, the robot (Not shown) having the spot welding machine 101 mounted thereto operates to make the upper, or lower welding gun 103 or 105 to move from the upper side or the lower side of the inserting hole 122 for removing the worn down welding tip 107 from the fore end of the upper, or lower welding gun 103 or 105.

Then, upon finishing movement of the upper, or lower welding gun 103 or 105, as the clamping cylinder 129 moves forward to make the clamper 125 to return to an initial position, the worn down welding tip 107 clamped inserted in the inserting hole 122 drops down on a floor of the workplace through the inserting hole 122 as the clamping on the welding tip 107 is released.

That is, in the present exemplary embodiment, the welding tip removing unit 120 repeats the foregoing steps, automatically removing the worn down welding tips 107 from the welding gun 103 and 105, respectively.

Figure 6:
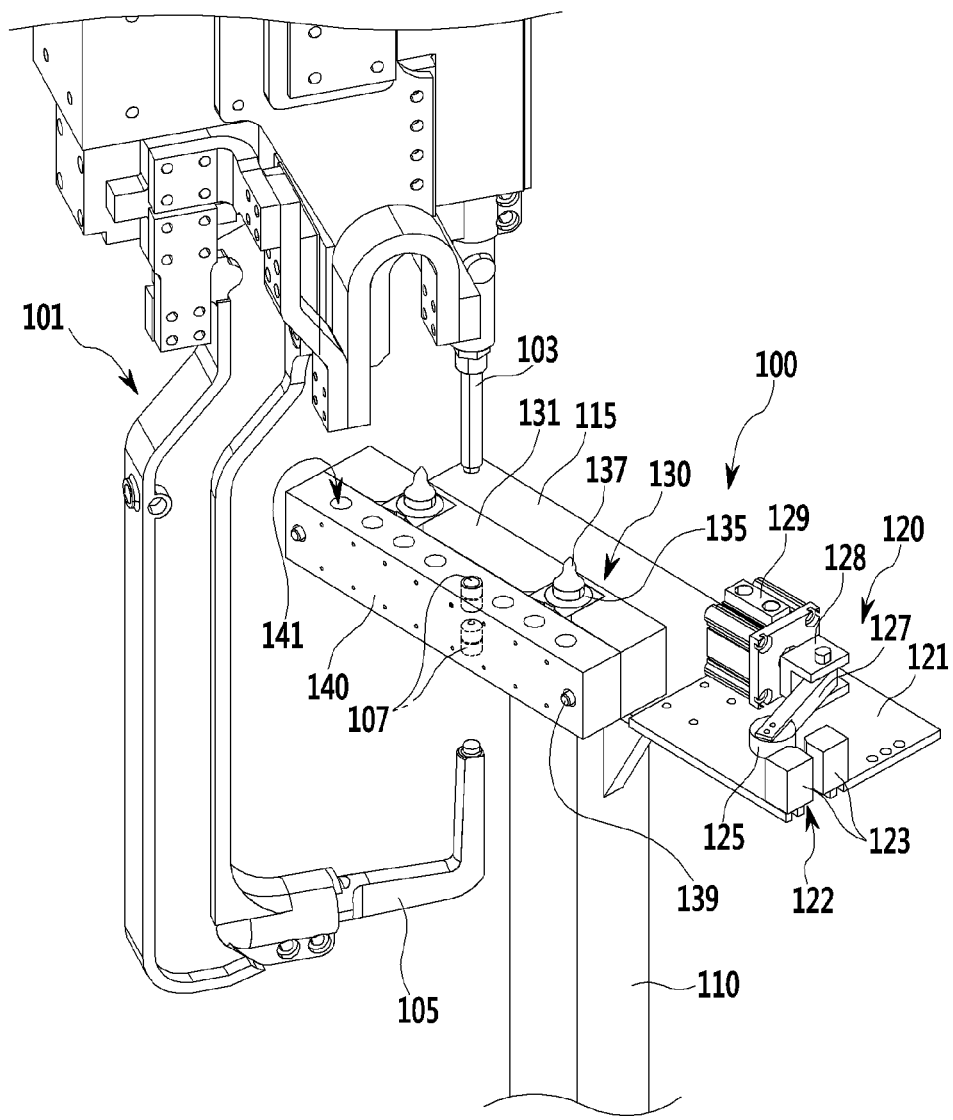

In the meantime, referring to FIG. 6, the upper, or lower welding gun 103 or 105 having removal of the worn down welding tip 107 finished thus moves to the welding tip cassette 140 mounted to the holding unit 130 and positions over or under the new welding tip 107 mounted in the holding hole 141 by the operation of the robot.

Figure 7:
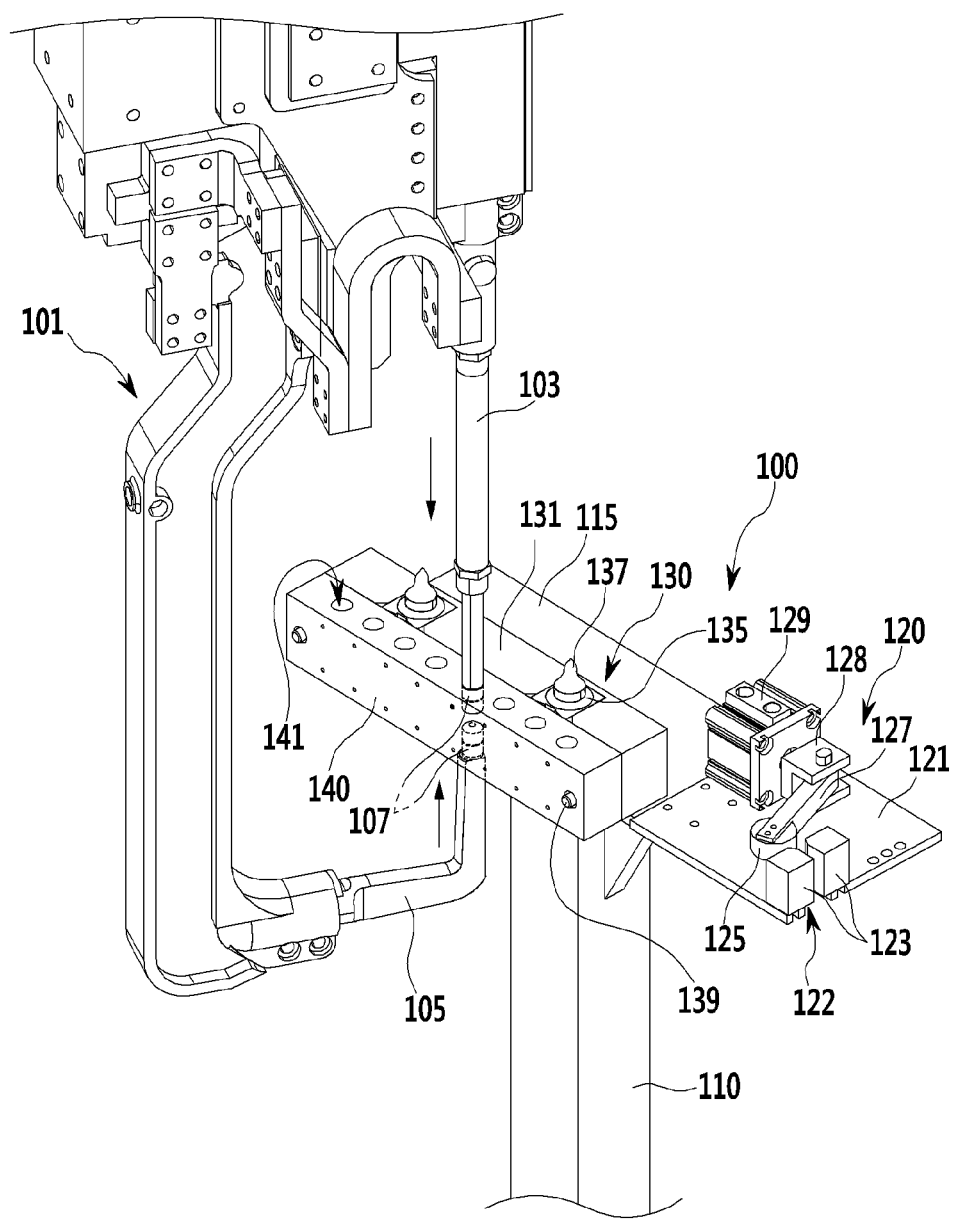

Then, referring to FIG. 7, the welding gun 103 or 105 moves toward the upper side or the lower side of the new welding tip 107 to replace mounted to the welding tip cassette 140, and mounts the new welding tips 107 to the fore end of the welding gun 103 or 105, simultaneously or respectively.

Figure 8:
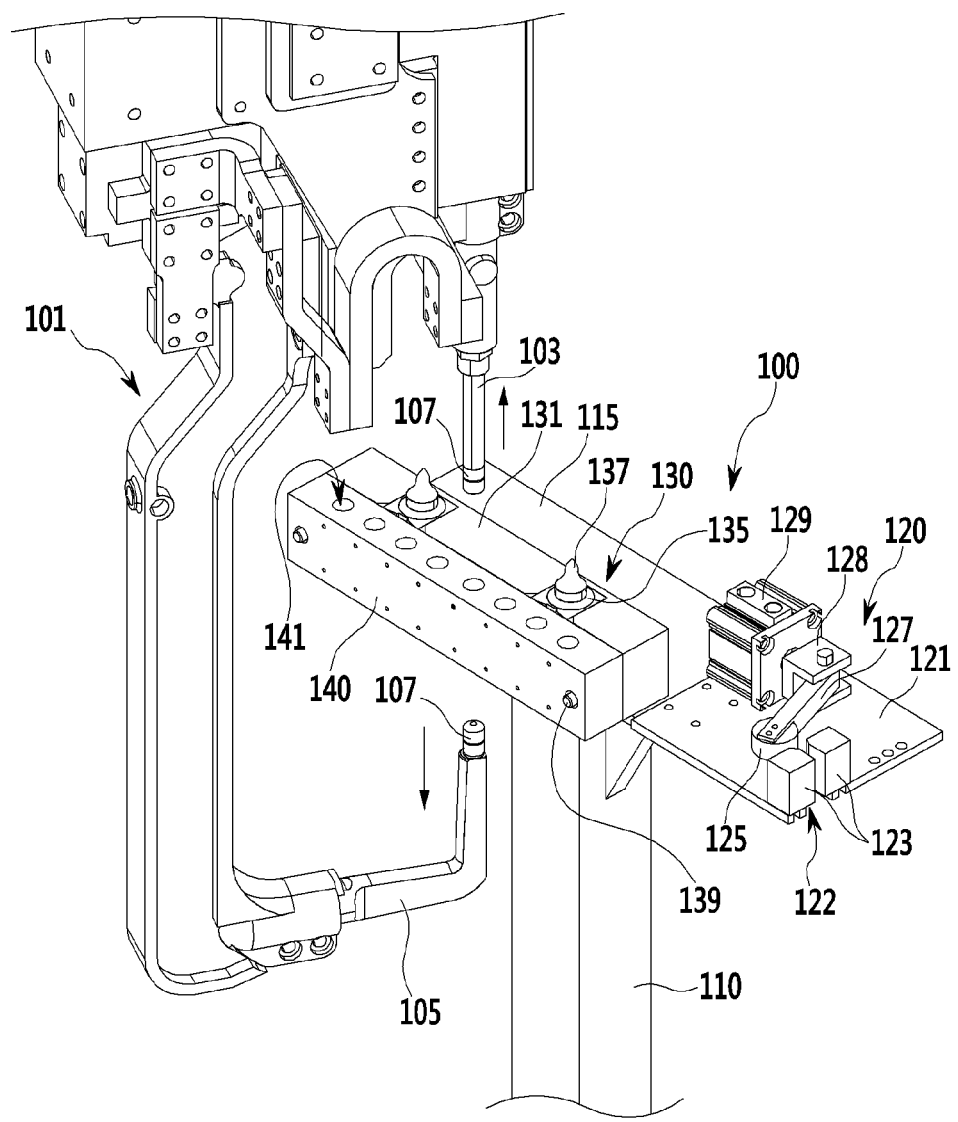
Figure 9:
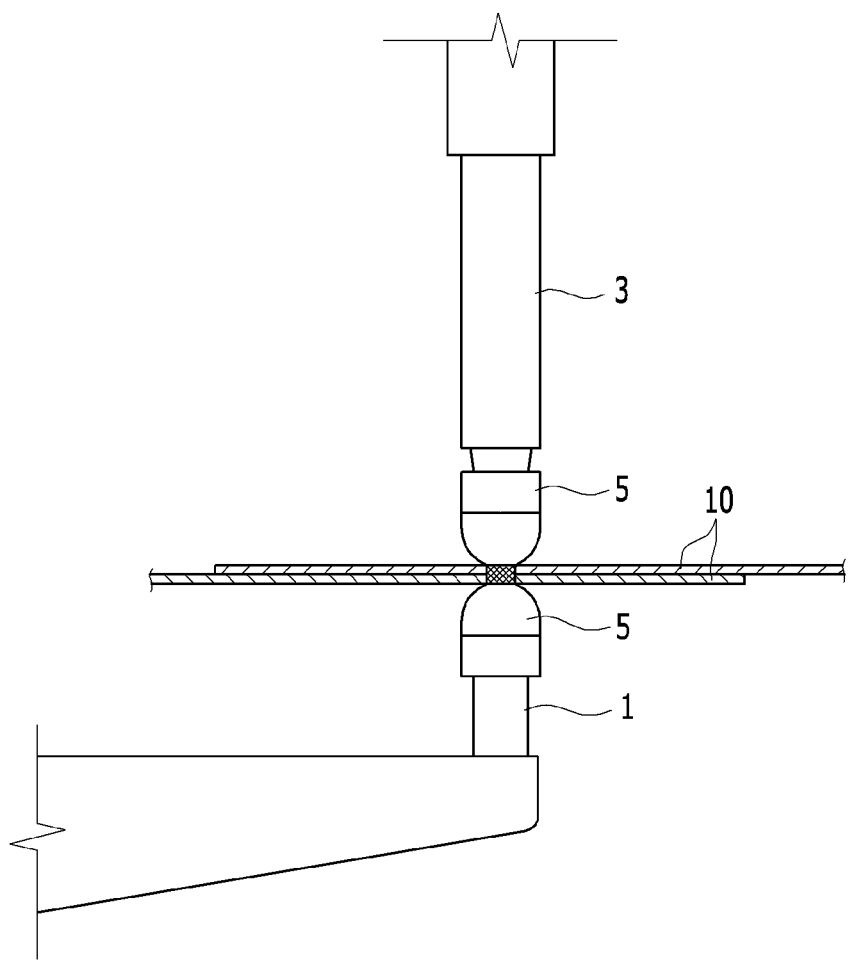
FIG. 9 illustrates a schematic diagram of a related art spot welding machine.

Referring to FIG. 8, upon finishing mounting of the new welding tip 107, the upper, or lower welding gun 103 or 105 move toward the upper side or the lower side of the welding tip cassette 140 opposite to described above to finish replacement of the new welding tips 107.

In the meantime, if the welding tips 107 set to the welding tip cassette 140 are consumed entirely, the worker turns off the operation switches 137 of the attaching members 135 and removes the welding tip cassette 140 from the holding unit 130, and mounts the welding tip cassette 140 to the holding unit 30 in a state new welding tips 107 are mounted in the holding holes 141, respectively.

Eventually, the apparatus for replacing a welding tip for spot welding 100 in accordance with an exemplary embodiment of the present invention permits automatic replacement of the worn down welding tips 107 when the welding tips 107 mounted to the upper, and lower welding guns 103 and 105 of the spot welding machine 101 are worn down for enabling to shorten a time period required for replacement and alignment of the welding tips 107, and to devise automation of the replacement process, thereby improving productivity and allowing to prevent defective welding tip replacement from taking place.

And, the automation of the welding tip replacement which has been done manually in the related art prevents the worker from being exposed to risky elements, to prevent accidents caused by negligence of safety from taking place, thereby safety of the worker can be secured.

Along with this, since partial damage of the welding tip 107 or misalignment of the upper, and lower welding guns 103 and 105 of the spot welding machine 101 at the time of the replacement work can be prevented, durability of the spot welding machine 101 can be improved, thereby permitting to save a maintenance cost.

Moreover, the possibility of replacement of the welding tips 107 mounted to the upper, and lower welding guns 103 and 105 with one apparatus 100 for replacing a welding tip for spot welding in accordance with an exemplary embodiment of the present invention permits to save production cost, such as a labor cost come from worker's manual work.

Thus, though the present invention has been described with a limited exemplary embodiment and drawings, the present invention is not limited to those, but it is apparent that different variations and modifications are possible by persons skilled in this field of art within technical aspects and a scope equivalent to the claims annexed hereto.

<Description of symbols>

| | |
|---|---|
| 100: welding tip replacing apparatus | 101: spot welding machine |
| 103: upper welding gun | 105: lower welding gun |
| 107: welding tip | 110: post |
| 115: base plate | 120: welding tip removing unit |
| 121: mounting plate | 122: inserting hole |
| 123: holding block | 125: clamper |
| 127: connecting bar | 128: clevis |
| 129: clamping cylinder | 130: holder unit |
| 131: holding block | 133: mounting recess |
| 135: attaching member | 140: welding tip cassette |
| 141: fixing hole | 143: through-hole |

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for replacing a welding tip for spot welding comprising:
    a post installed in a workplace having a spot welding machine with upper, and lower welding guns provided thereto;
    a base plate mounted on a top of the post;
    a welding tip removing unit mounted on an upper side of the base plate for clamping and removing a spent welding tip mounted to the upper welding gun or the lower welding gun by operation of a cylinder;
    a holder unit mounted on the upper side of the base plate spaced from the welding tip removing unit; and
    a welding tip cassette mounted to the holder unit in a state new welding tips to be mounted to the upper, and lower welding guns are set in an upper side and a lower side thereof,
    wherein the welding tip removing unit includes;
    a mounting plate mounted to the upper side of the base plate having an inserting hole formed in one side thereof for inserting the worn down welding tips mounted to the upper, and lower welding guns therein from an upper side and a lower side thereof,
    supporting blocks mounted on the mounting plate spaced a predetermined distance from each other on both sides of the inserting hole with the inserting hole disposed therebetween for holding one side of the welding tip at the upper, and lower welding guns inserted into the inserting hole,
    a clamper rotatably mounted to the mounting plate opposite to the supporting blocks in a state a rotation center of the clamper is positioned eccentric from a center of the clamper,
    a connecting bar having one end connected to the clamper, and
    a clamping cylinder mounted on the mounting plate to have a fore end of a operating rod thereof connected to the other end of the connecting bar.

2. The apparatus of claim 1, wherein
    the welding tip cassette is formed of a steel material.

3. The apparatus of claim 1, wherein
    each of the supporting blocks has a corner portion positioned at a center of the inserting hole sloped to an outside from a center of the inserting hole to form a sloped side.

4. The apparatus of claim 1, wherein
    the clamper is formed to have a circular block shape for making rotary translation toward the inserting hole when the clamping cylinder moves forward or backward.

5. The apparatus of claim 1, wherein
    the clamper is rotatably mounted at a position spaced a predetermined distance upward from the mounting plate with a fixing rod mounted to the mounting plate.

6. The apparatus of claim 1, wherein
    the clamping cylinder is a pneumatic cylinder operated by a pneumatic operating pressure.

7. The apparatus of claim 1, wherein
    the clamping cylinder is a hydraulic cylinder operated by a hydraulic operating pressure.

8. The apparatus of claim 1, wherein
    the welding tip mounted to a fore end of the upper welding gun is inserted in the inserting hole from an upper side of the inserting hole toward the lower side of the inserting hole, and the welding tip mounted to a fore end of the lower welding gun is inserted in the inserting hole from the lower side of the inserting hole toward the upper side of the inserting hole.

9. The apparatus of claim 1, wherein the fore end of the operating rod of the clamping cylinder is connected to the connecting bar with a clevis.

10. The apparatus of claim 1, wherein the holder unit includes;
a holding block mounted to the other side of the upper side of the base plate adjacent to the welding tip removing unit to have at least one mounting recess formed therein, and
an attaching member mounted to the mounting recess for securing the welding tip cassette mounted to the holding block in a state the welding tip cassette is attached to the holding block.

11. The apparatus of claim 10, wherein the mounting recess is formed in one side facing an outside of the holding block spaced a preset distance from, and opposite to, each other.

12. The apparatus of claim 10, wherein the attaching member includes a magnetic block having an operation switch provided to an upper side thereof for generating electromagnetic force selectively when the operation switch is operated.

13. The apparatus of claim 10, wherein the attaching member has a square hexahedron cross section.

14. The apparatus of claim 10, wherein the holding block has inserting rods mounted on opposite ends with the mounting recess arranged therebetween, respectively.

15. The apparatus of claim 1, wherein the welding tip cassette has a plurality of holding holes formed in an upper side and a lower side in a length direction thereof for inserting and setting the welding tips and pass through holes formed in a width direction thereof on opposite ends thereof.

16. The apparatus of claim 15, wherein the holding holes are formed at fixed intervals in the length direction of the welding tip cassette.

* * * * *